US008913731B2

(12) United States Patent
Fujita-Yuhas

(10) Patent No.: US 8,913,731 B2
(45) Date of Patent: *Dec. 16, 2014

(54) METHOD AND SYSTEM FOR PROVIDING AN AUDIO REPRESENTATION OF A NAME

(71) Applicant: Tim Fujita-Yuhas, Seattle, WA (US)

(72) Inventor: Tim Fujita-Yuhas, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,224

(22) Filed: Apr. 8, 2013

(65) Prior Publication Data

US 2013/0226564 A1    Aug. 29, 2013

Related U.S. Application Data

(63) Continuation of application No. 11/691,290, filed on Mar. 26, 2007, now Pat. No. 8,416,926.

(51) Int. Cl.
| *H04M 3/42* | (2006.01) |
| *G10L 25/48* | (2013.01) |
| *H04M 1/56* | (2006.01) |
| *H04M 1/2745* | (2006.01) |
| *H04M 3/56* | (2006.01) |

(52) U.S. Cl.
CPC ............ *G10L 25/48* (2013.01); *H04M 3/42042* (2013.01); *H04M 3/42365* (2013.01); *H04M 2201/39* (2013.01); *H04M 1/56* (2013.01); *H04M 1/27455* (2013.01); *H04M 3/56* (2013.01)
USPC ..................................... 379/218.01; 704/201

(58) Field of Classification Search
USPC .................................. 379/72, 218.01; 704/201
See application file for complete search history.

(56) References Cited

U.S. PATENT DOCUMENTS

| 5,511,111 | A |  | 4/1996 | Serbetcioglu et al. |
| 5,602,963 | A | * | 2/1997 | Bissonnette et al. .......... 704/275 |
| 5,651,053 | A |  | 7/1997 | Mitchell |
| 5,729,592 | A |  | 3/1998 | Frech et al. |
| 5,799,063 | A |  | 8/1998 | Krane |
| 6,052,438 | A |  | 4/2000 | Wu et al. |
| 6,233,325 | B1 |  | 5/2001 | Frech et al. |
| 6,310,948 | B1 |  | 10/2001 | Nemeth |
| 6,388,560 | B1 | * | 5/2002 | Parvulescu et al. .......... 340/7.52 |
| 6,473,615 | B1 |  | 10/2002 | Thappasandra et al. |
| 6,775,363 | B2 |  | 8/2004 | Conn et al. |
| 6,999,563 | B1 | * | 2/2006 | Thorpe et al. ................. 379/67.1 |
| 7,136,475 | B1 | * | 11/2006 | Rogers et al. ............. 379/213.01 |
| 7,280,849 | B1 | * | 10/2007 | Bailey ........................... 455/563 |
| 7,548,614 | B2 |  | 6/2009 | Sharma |
| 7,606,359 | B1 | * | 10/2009 | Reding et al. ............. 379/265.01 |
| 7,822,188 | B1 | * | 10/2010 | Kirchhoff et al. ......... 379/211.02 |
| 8,041,568 | B2 | * | 10/2011 | Strope et al. ................... 704/257 |
| 2003/0109290 | A1 | * | 6/2003 | Moffi et al. .................... 455/569 |
| 2007/0197266 | A1 | * | 8/2007 | Chang ......................... 455/575.2 |

\* cited by examiner

*Primary Examiner* — Simon Sing
(74) *Attorney, Agent, or Firm* — Baker Botts L.L.P.

(57) ABSTRACT

A system and method for providing an audio representation of a name includes providing a list of a plurality of users of a network and respective presence information regarding each of the plurality of users; receiving a request from an endpoint to receive an audio representation of a name of a particular user of the plurality of users, and providing the audio representation to the endpoint. Moreover, the audio representation of the name at least generally approximates a pronunciation of the name as pronounced by the particular user.

16 Claims, 2 Drawing Sheets

METHOD AND SYSTEM FOR PROVIDING AN
AUDIO REPRESENTATION OF A NAME

CROSS REFERENCE TO RELATED APPLICATION:

This application is a continuation of U.S. application Ser. No. 11/691,290, filed Mar. 26, 2007, by Tim Fujita-Yuhas and entitled "Method and System for Providing an Audio Representation of a Name", now U.S. Pat. No. 8,416,926.

TECHNICAL FIELD OF THE INVENTION

This invention relates in general to network communication and information storage and more particularly, to a system and method for providing an audio representation of a name.

BACKGROUND OF THE INVENTION

Present day technologies are making the need for personal introductions less prevalent. Often, initial contact between two or more people stems from a referral that was gained through relatively impersonal means (e.g., a phone book, a web site, a business card, an e-mail, etc.) Consequently, it has become commonplace for one person to contact another without having anything more than a written representation of the name of the person whom he/she is trying to contact.

BRIEF DESCRIPTION OF THE DRAWINGS

For a more complete understanding of the present invention and its advantages, reference is now made to the following description, taken in conjunction with the accompanying drawings, in which.

DESCRIPTION OF EXAMPLE EMBODIMENTS

Overview

The present invention includes a system and method for providing an audio representation of a name. In one embodiment, the system and method provides a list of a plurality of users of a network and respective presence information regarding each of the plurality of users. The system and method receives a request from an endpoint to receive an audio representation of a name (e.g., an appropriate/user preferred pronunciation of the user's name) of a particular user of the plurality of users, and accordingly provides the audio representation to the endpoint. In accordance with a particular embodiment of the present invention, the audio representation is provided based on presence and/or call routing rules and client context. Moreover, the provided audio representation of the name at least generally approximates the pronunciation of the name as pronounced by the particular user.

Figure 1:
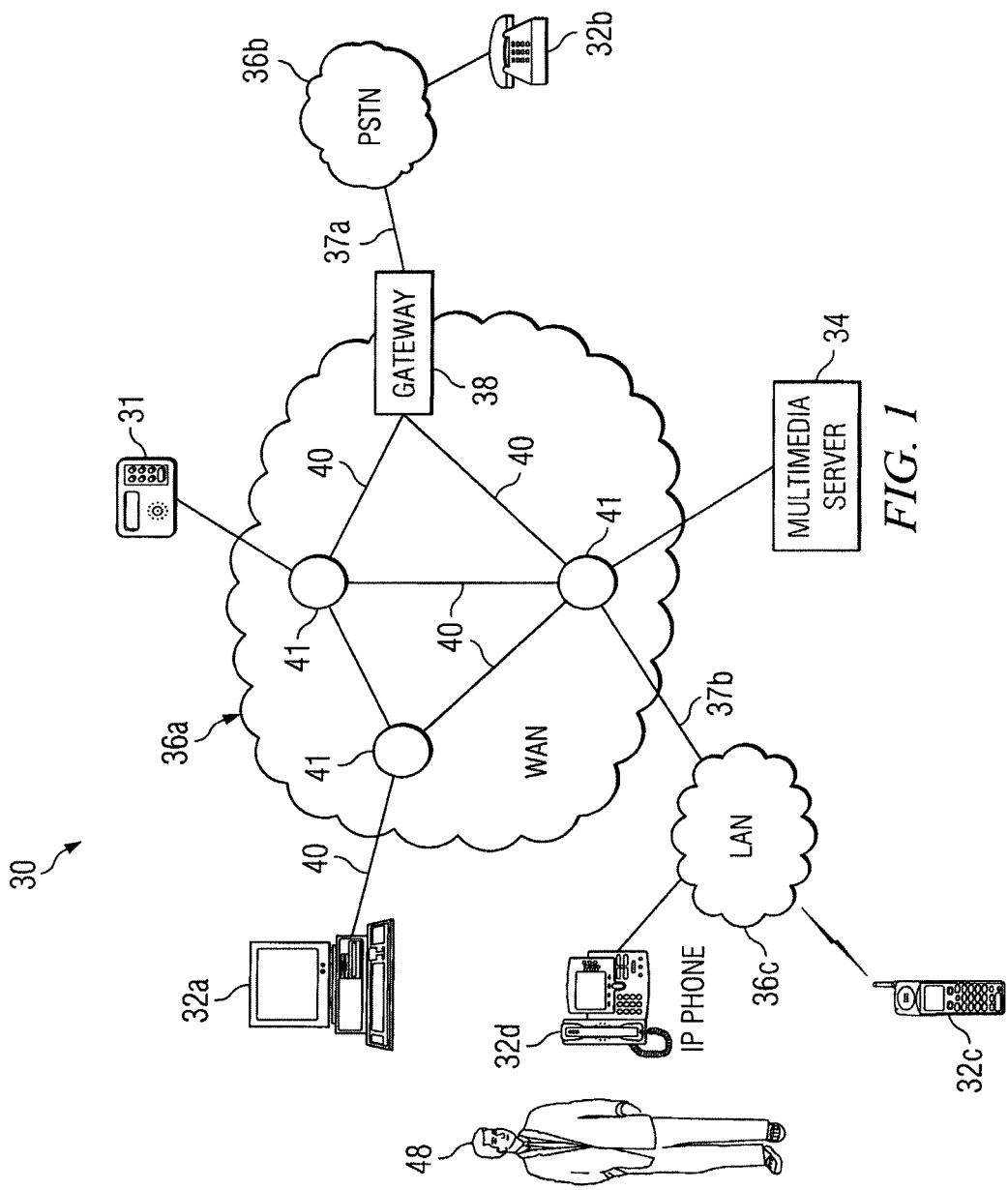
FIG. 1 illustrates a communication system including a plurality of endpoints associated with a single party and operable to communicate among each other and a multimedia server, in accordance with a particular embodiment of the invention.

FIG. 1 illustrates a communication system 30 including a plurality of endpoints 32a-32d, each associated with a called party 48, and each having the ability to establish communication sessions between each other and/or a multimedia server 34, using one or more of communication networks 36a-36c. For purposes of this specification the terms "client", "phone", "telephone" and/or "endpoint" may be used interchangeably to refer to any personal computer (PC), telephone, IP Phone, cellular, mobile or wireless phone, answering machine, messaging system, and/or any other remote system or device that has the ability to communicate audio, video, and/or text communications. A remote system may include any endpoint or other device that is separated from multimedia server 34 by geography, and/or physical separation, whether or not connected to multimedia server 34 by a network.

The teachings of the present invention may utilize a communication system such as communication system 30 to provide a calling party (not pictured) with a prerecorded audio representation of a name, nickname, or other preferred name (e.g., appropriate/preferred pronunciation) of the party to whom the calling party is placing a call (in this case, called party 48). Particular embodiments may use a multimedia server 34 to provide such information by communicating with several clients 32a-32d (all of which may be associated with the called party 48) to retrieve and/or access an audio representation of the called party's name or nickname that has been previously recorded by the called party 48 using one of the clients 32a-32d on a memory associated with one of the clients 32a-32d.

For example, it is often the case that a called party has, at one time or another, recorded a pronunciation of his name to a memory associated with a phone. Most, if not all, business phones may be associated with a voicemail service such as a business messaging system. Many voicemail services prompt a party to record a version of the party's name upon initialization of the voicemail service, for example, as in the case of a new employee of a company who is prompted to record his name to the company's phone system upon introduction of his persona into the company's messaging system. The recording may then be stored on a memory associated with the voicemail service for later retrieval. Accordingly, when the party later receives a call at his business phone and is unavailable, the voicemail service may retrieve the prerecorded pronunciation of the called party's name and play it back to the calling party along with a message prompting the calling party to leave a message. One of ordinary skill in the art will recognize that this scenario is but one of a host of ways in which a called party may come to have a prerecorded pronunciation of his name or a desired nickname stored to a memory associated with a phone. However, in some instances it may be desirable to make the recording of the called party's name accessible to a calling party who calls another endpoint associated with the called party.

Accordingly, in a particular embodiment of the present invention, a calling party (not pictured) may not know the number for the called party's business phone 32d—where the called party 48 has previously recorded his name—and may rather place a call to the called party's cell phone 32c, Multimedia server 34 may be operable to detect the incoming request for communication with cell phone 32c and establish contact (e.g., using the appropriate presence based call routing rules) with the called party's business phone 32d or any number of other clients (e.g., endpoints 32a-32d) associated with called party 48 to search for a recorded pronunciation of the called party's name. Upon finding such information, the multimedia server 34 may then make the recorded pronunciation of the called party's name available to the calling party.

In the illustrated embodiment, endpoints 32a-32d, multimedia server 34, messaging system 31, and/or gateway 38 may be any combination of hardware, software, and/or encoded logic that provides communication services to a party 48. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a.

Endpoints 32a-32d may individually or collectively be associated with a number of memories (e.g., the memory of messaging system 31), each memory capable of storing data from and/or for any of the endpoints 32a-32d with which it is associated. The stored data may include, for example, audio data such as an audio recording of the name of called party 48 or a message from a calling party, video data such as digital photos or movies, or any other type of data capable of being stored on a memory.

Memories such as those contained in messaging system 31 are numerous in their respective configurations, constructions, and interrelations. Memories could include, for example, a media storage device, such as a hard drive, diskette, a tape, CD-R, CD-RW, DVD-RAM, or any solid state memory device or any other data storage device. For example, any and/or every one of endpoints 32a-32d may have an internal memory capable of storing data. Furthermore, each of the endpoints 32a-32d may be associated with any number of other networks (not pictured), each network capable of containing a number of memories, such as those contained in personal computers, network servers, answering machines, or voicemail accounts on third-party servers, wherein each of devices 32a-32d may store data.

The messaging system 31 may be as simple as an answering machine or a voicemail account, or may be more complex, for example, a subsystem of an integrated business phone system. Each messaging system may be capable of storing data from and/or for any endpoint with which it is associated.

Multimedia server 34 may be capable of accessing each of endpoints 32a-32d directly, and moreover, may be capable of accessing and/or retrieving data stored on any and/or every one of the memories associated with any of the endpoints 32a-32d. Accordingly, when a calling party requests communication with called party 48, multimedia server 34 may be operable to access stored data associated with any one of the endpoints 32a-32d and to provide that stored data to the calling party.

For example, in a particular embodiment, a called party 48 may possess a cell phone 32c, Cell phone 32c may further be associated with a messaging system, represented here, as messaging system 31. Messaging system 31 may have required called party 48 to record one or more pronunciations of his name upon initialization of the called party's phone service. Normally, a playback of this recording would only be accessible to a calling party through a call placed to the called party's 48 cell phone 32c. However, in particular embodiments, multimedia server 34 may be capable of accessing the recorded pronunciation of the called party's name (stored on the messaging system 31) and playing it back for the calling party, no matter which of the endpoints 32a-32d the calling party uses to summon the called party 48. Moreover, it is within the scope of this invention that similar functionality may be operable through any of endpoints 32a-32d using data stored on any memory or memories (either internal or external) associated with any of endpoints 32a-32d. Additionally, multimedia server 34 may be further operable to delay connection of the call between the parties until the calling party has been provided with a pronunciation of the called party's name.

In particular embodiments, a called party may record several different versions of his name (e.g., a version in a different language, a formal version, a nickname, etc.). The called party may intend for each version of his name to be provided to different classes of calling parties, or to particular individuals. As an example and not by way of limitation, the called party may record a formal version of his name intended for business acquaintances (e.g., unknown callers at his business phone), while recording a nickname intended for social acquaintances (e.g., friends or family). In particular embodiments, a called party may record his name in another language or in a particular accent. In particular embodiments, an employee of a call center or customer support line may record several different versions of his name, each version being associated with a different company serviced by the support center (e.g., John Smith Cisco, John Smith Linksys, or John Smith Scientific Atlanta). Particular embodiments may use presence based call routing rules, caller identification information, or phone number association to provide a particular version of a called party's name to an appropriate calling party.

Communication network 36a may be a wide area network (WAN) that enables communication between a plurality of endpoints 32a-32d and multimedia servers 34 distributed across multiple cities and geographic regions. Communication network 36b is a public switched telephone network (PSTN) and couples endpoint 32b with communication network 36a through gateway 38. Communication network 36c may be a local area network (LAN), which couples endpoints 32c and 32d with communication network 36a. Accordingly, users of endpoints 32a-32d can establish communication sessions between and among each network component coupled for communication with one or more of networks 36a-36c. Communication links 37a and 37b couple communication networks 36a and 36b, and communication networks 36a and 36c, respectively.

Communication network 36a includes a plurality of segments 40 and nodes 41 that couple endpoint 32a with multimedia server 34, gateway 38, and communication networks 36b-36c. Therefore, a user of endpoint 32a is provided with access to endpoints 32b-32d, messaging system 31, and multimedia server 34. Nodes 41 may include any combination of network components, gatekeepers, call managers, routers, hubs, switches, gateways, endpoints, or other hardware, software, or embedded logic implementing any number of communication protocols that allow for the exchange of data packets in communication system 30.

Although the illustrated embodiment includes three communication networks 36a-36c, the term "communication network" should be interpreted as generally defining any network capable of transmitting audio and/or video telecommunication signals, data, and/or messages. Any one of networks 36a-36c may be implemented as a local area network (LAN), wide area network (WAN), global distributed network such as the Internet, an intranet, extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or multimedia servers 34.

In a particular embodiment, communication network 36a employs voice communication protocols that allow for the addressing or identification of endpoints, nodes, and/or servers coupled to communication network 36a, For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b may include switching stations, central offices, mobile telephone switching offices, pager switching offices, remote terminals, and/or other related telecommunications equipment that are located throughout the world. IP networks transmit data (including voice, text and/or video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, multimedia server 34, and gateway 38 are IP telephony devices. IP telephony devices have the ability of encapsulating a user's voice (or other input) into IP packets so that the voice can be transmitted over network 36a, IP telephony devices may include telephones, computers running telephony software, nodes, gateways, or any other devices capable of performing telephony functions over an IP network.

Components of communication system 30 may utilize session initiation protocol (SIP) technology in the transmission of audio, video or other data across the system. As a result, users of endpoints 32a-32d may be identified by components of system 30 according to a uniform reference identifier (URI), such as a user's e-mail address, or other suitable identifier so that a user may be located, monitored and/or contacted through presence detection technology. The use of presence detection and caller identify or call routing rules by components of system 30 enable the components to capture information about various communication devices, or endpoints, available to a user, and their status, such as whether a cellular phone is switched on or whether a user is logged into a personal computer (PC). The versatility of presence enables it to be used in both IP components, such as IP phone 32d, and other, non-IP components, such as components of PSTN 36b, For example, gateway 38 may comprise a SIP/PSTN gateway so that components coupled to PSTN 36b may utilize features and capabilities available through SIP technology.

Endpoints 32a-32d may also include unattended or automated systems, gateways, other intermediate components, or other devices that can establish media sessions. Although FIG. 1 illustrates a particular number and configuration of endpoints, servers, segments, nodes, and gateways, communication system 30 contemplates any number or arrangement of such components for communicating media. Furthermore, any or all of the components illustrated as part of multimedia server 34 may be separate from multimedia server 34 and/or distributed locally or remotely from multimedia server 34.

Figure 2:
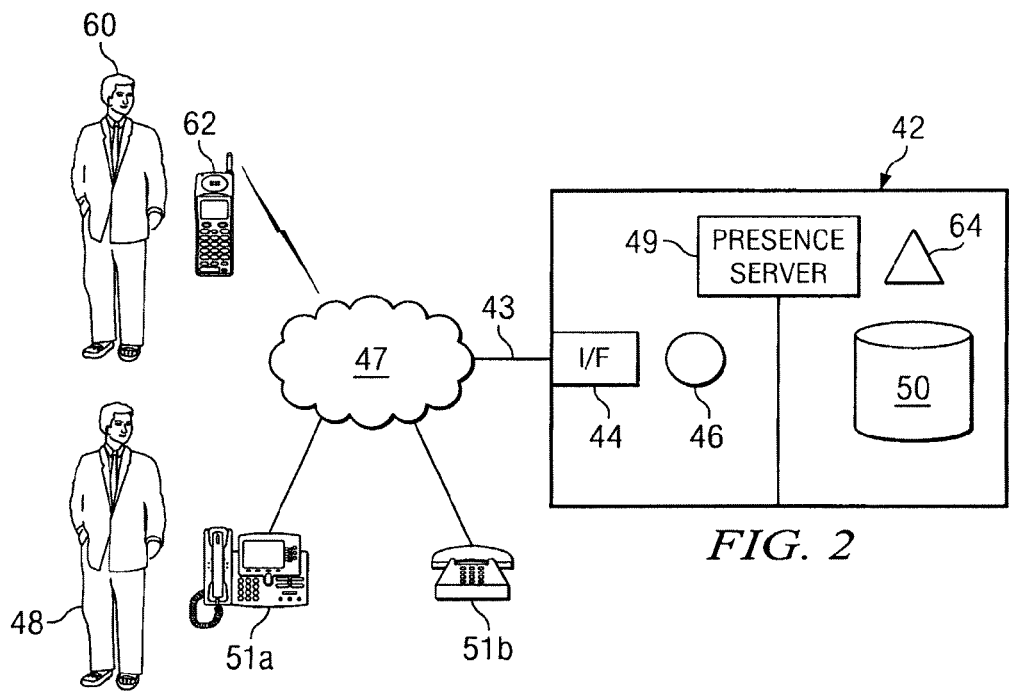
FIG. 2 illustrates an alternative embodiment wherein a communication system similar to the communication system of FIG. 1 is used for communication between two parties.

FIG. 2 illustrates a network 47 (similar to network 36a of FIG. 1) and endpoints through which a calling party 60 may request communication with a called party 48. In the illustrated embodiment, the called party 48 has access to, and is associated with, endpoints 51a and 51b. Endpoint 51a is an office phone, and endpoint 51b may be one or more of a home phone, PC, cell phone, IP phone, PDA, and/or other communication device. Calling party 60 has access to a cell phone 62. Also included in the pictured embodiment is a multimedia server 42 (similar to the multimedia server 34 in FIG. 1). It will be recognized by those of ordinary skill in the art that endpoints 51a, 51b, and 62 may be any type of endpoint described within this specification, and that any particular party (e.g., called 48 and/or calling party 60) may have one or more endpoints with which they are associated and/or use.

In accordance with the teachings of the present invention, a call initiated by calling party 60 using a cell phone 62, intended for the office telephone 51a of called party 48, may be directed to multimedia server 42 upon initiation of the call. Multimedia server 42 may delay connection of the call until it checks the presence and/or call routing rules and/or provides the calling party 60 with an appropriate recording of the called party's 48 name. The recording of the called party's name may be one or more audio files that reside locally on voicemail system 64, or in embodiments wherein the voicemail system is external to the multimedia server 42, the audio file may be either retrieved or remotely accessed through network 47 by the multimedia server 42 in order to accomplish playback of the called party's 48 name to the calling party 60.

In the pictured embodiment, multimedia server 42 may be capable of locally storing data associated with any of the endpoints 51a, 51b, or 60. Such functionality may be accomplished through the messaging system 64 that resides in the multimedia server 42. In accordance with this embodiment, multimedia server 42 could request called party 48 to provide a pronunciation of his name through either his office phone 51a or through his home phone (representative of endpoint 51b). Multimedia server 42 could then locally store the recorded pronunciation (for example as a .wav file, a .mp3 file, a .midi file or a .wma file) for later play back to a calling party 60 who calls either of endpoints 51a or 51b.

In another embodiment, the multimedia server 42 may prompt a calling party to provide a pronunciation of the calling party's own name, a desired nickname and/or a pronunciation in a preferred language or with an appropriate tag line (e.g., "John Smith, Linksys Support") when requesting communication with called party 48. The pronunciation of the calling party's name may then be stored and/or played for called party 48 before the call between the two parties is connected. Recordation and storage of the calling party's name is not meant to be limited to embodiments where the multimedia server 42 provides the means for recordation and storage; rather, similar functionality may be available through any of endpoints 51a or 51b and/or any memories and/or functions associated therewith. Consequently, the functionality of the multimedia server 42 may include coordinating the independent functionality of each of the endpoints 51a or 51b to achieve the desired recordation, storage, and retrieval of a party's name using the resources associated with endpoints 51a and/or 51b, Such coordination may include referencing data stored on a remote system, for example, by directing a calling party to a particular data field stored on a remote system using a hyperlink, or synchronizing with the remote system, for example, by automatically connecting a calling party with the data stored on the remote system.

Voicemail system 64 operates in conjunction with the telephony devices coupled to network 47. In various embodiments, voicemail system 64 may comprise a multimedia messaging system. Thus, the teachings of the present invention are not limited to messaging systems that handle voice only. Inclusion of pictorial, video, or other data is also envisioned. As will be described below, the integration of telecommunication services into network 47 allows voicemail messages to be encrypted and stored in an open file system supported by network 47, for access by an authorized user for a variety of devices in network 47.

Although illustrated as a dedicated network device, the software, firmware and/or hardware used to implement voicemail system 64 may be incorporated into and/or distributed amongst one or more devices on network 47. Voicemail system software may be embodied in any type of computer-readable medium. The computer or other device on which the voicemail software is located includes a network interface, a memory or other computer-readable medium to store the software, and a processor to execute the software.

One advantage of a VoIP telecommunication system (as described above with reference to FIG. 1) is that audio files can be stored in "open" locations that are accessible from devices in network 47, as well as devices coupled to network 47; moreover, files in "open" locations are accessible to multimedia server 42 allowing multimedia server 42 to access an audio file (e.g., a prerecorded name pronunciation) stored in a file system on numerous devices in communication network 47 including, but not limited to, a telephony device or computer coupled to network 47. Such file systems may include a memory, such as a hard drive, diskette, CD-R, CD-RW, DVD-RAM, or any other modifiable storage device.

Multimedia server 42 may include the same components and operate in a similar manner to multimedia server 34 of FIG. 1, and vice-versa. Multimedia server 42 includes an interface port 44 which couples multimedia server 42 with a communication network 47, using segment 43. Communication network 47 may comprise one or more networks such as those described with respect to communication system 30 of FIG. 1.

Processor 46 may use a memory lookup, a database or other memory module, such as memory module 50, in determining how to distribute and/or process a call. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

Multimedia server 42 includes a presence server 49 that may be any combination of hardware, software and/or encoded logic. As further discussed below, in one embodiment presence server 49 utilizes SIP technology to detect and/or monitor the presence of a particular user (e.g., user 48) at an endpoint, (for example, at the user's PC, cell phone, IP phone or other device) and associate a call with a user's presence. Other non-SIP presence or caller identity or call routing rule techniques known in the art may be used in other embodiments. To accomplish such functionality, presence server 49 may have access to any relevant information relating to or associated with the endpoints the user utilizes or accesses to communicate with the multimedia server.

It will be recognized by those of ordinary skill in the art that multimedia server 42 may include any number of processors or memory modules to accomplish the functionality and features described herein. The processors 46, memory modules 50 and/or presence server 49 associated with multimedia server 42 may be centrally located (local) with respect to one another, or distributed throughout communication network 47.

Figure 3:
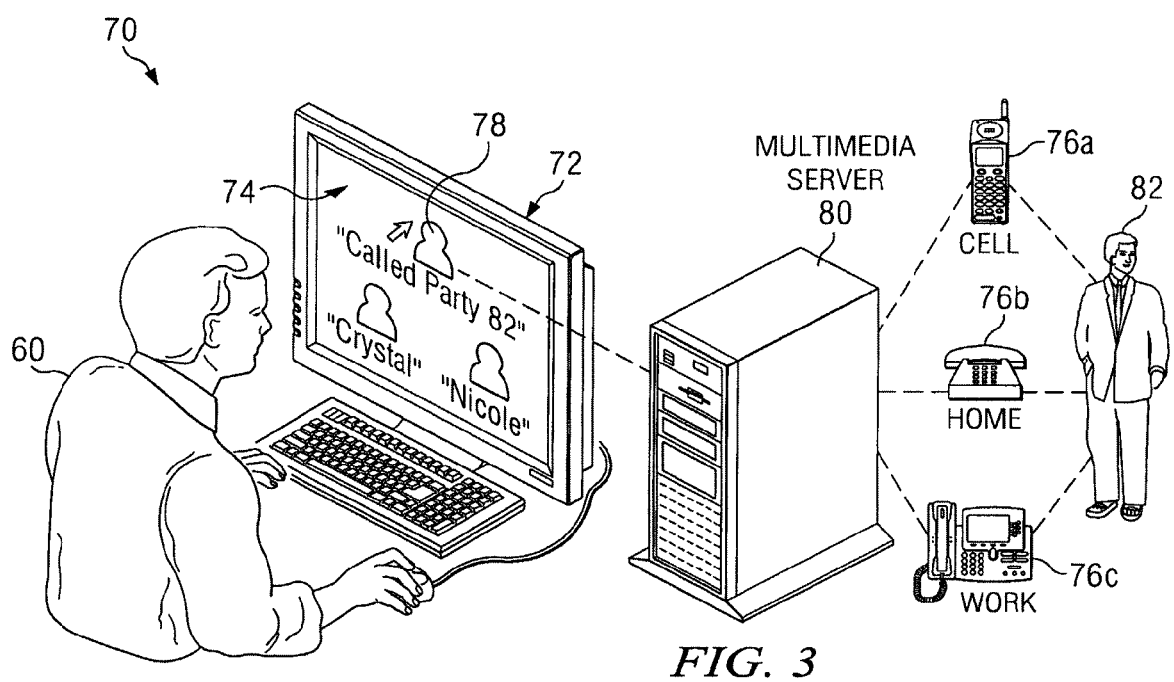
FIG. 3 illustrates an alternative embodiment wherein a calling party uses a PC to access a recording of the called party's name.

FIG. 3 shows an embodiment of the invention wherein a calling party 60 uses a PC 72 to retrieve a pronunciation of a called party's name (which may be provided in a multitude of languages) by selecting an icon 78 associated with the called party 82 from a list of icons 74, each associated with a different called party. A multimedia server 80 (similar in functionality to Multimedia server 34 in FIG. 1) may receive the calling party's request for a pronunciation of the called party's name and may further be operable to retrieve or reference a prerecorded pronunciation of the called party's name from any of the endpoints 76a-76c and to deliver the prerecorded pronunciation to calling party 60. After delivering the prerecorded pronunciation of the called party's name to the calling party, multimedia server may or may not connect the calling party to any of the endpoints 76a-76c for real-time communication. Thus, multimedia server 80 may be operable to provide the calling party 60 with a pronunciation of the called party's name without actually connecting the parties for real-time communication. This allows calling party 60 to request to hear the pronunciation of the called party's name, without initiating a communication connection with the called party.

Each of the icons in the list of icons 74 may be associated with presence information regarding the party associated with the icon. Such presence information could include for example whether the party is currently active on the network (e.g., signed-on), which of the endpoints 76a-76c a party has last used, or which of the plurality of endpoints 76a-76c a party has designated as his favored communication point. Moreover, the list of icons could be presented to the calling party 60 by any number of user interfaces such as instant messaging services (e.g., AOL Instant Messenger®, Yahoo Messenger®, Google Talk®, ICQ®, and Skype®), a site allowing for the listing of a profile (e.g., Facebook®, My Space®, Match.com®, or Friendster®), or an independently created listing system.

It should further be noted that the calling party 60 can request a pronunciation of a called party's name in any number of ways including placing a telephone call, clicking on an icon associated with the called party using a PC-based telephony service, requesting connection with the called party through a telephone directory service, or selecting a name from a list of names stored on a database and accessible through an IP phone menu. In particular embodiments, different recordings may be displayed to the calling party 60 based on the context of the calling party's request. For example, a first pronunciation may be displayed to the calling party 60 in the context of a social network while a second pronunciation may be displayed to the calling party 60 in the context of a professional network.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method comprising:
creating a recording of a name of a particular user in a network, the recording of the name comprising an audio representation of an accurate pronunciation of the name;
storing the recording of the name in a storage location within the network;
providing a list of a plurality of user names and respective presence information regarding each of the plurality of users;
receiving a request from an endpoint for the recording of the name of the particular user, the request for the recording being generated by the endpoint selecting the name of the particular user from the list of the plurality of user names;
accessing the storage location in response to the request;
providing the recording of the name of the particular user in response to the request from the endpoint;
wherein creating the recording of the name comprises creating a first version and a second version of the audio representation; and
wherein providing the recording of the name comprises providing the first version or the second version of the audio representation based on presence based call routing rules, caller identification information, or phone number association.

2. The method of claim 1, wherein the audio representation of an accurate pronunciation of the name comprises an audio representation made by the particular user.

3. The method of claim 1, further comprising receiving a request from the endpoint to initiate a communication connection with the particular user.

4. The method of claim 3, further comprising providing an audio representation of a name of a user affiliated with the endpoint to the particular user upon initiation of the communication connection.

5. The method of claim 1, wherein the list of the plurality of user names is associated with an instant messaging service.

6. The method of claim 1, further comprising associating the particular user with a plurality of possible endpoints.

7. The method of claim 6, further comprising providing presence information regarding which endpoint of the plurality of possible endpoints the particular user last used.

8. The method of claim 6, further comprising providing presence information regarding which endpoint of the plurality of possible endpoints the particular user favors.

9. A system comprising:
an interface operable to provide a list of a plurality of user names and respective presence information regarding each of the plurality of users;
a processor operable to:
create a recording of a name of a particular user in a network, the recording of the name comprising an audio representation of an accurate pronunciation of the name;
store the recording of the name in a storage location within the network;
receive a request from an endpoint for the recording of the name of the particular user, the request for the recording being generated by the endpoint selecting the name of the particular user from the list of the plurality of user names; and
access the storage location in response to the request; and
a transmission module operable to provide the recording of the name of the particular user in response to the request from the endpoint;
wherein the processor operable to create the recording of the name comprises a processor operable to create a first version and a second version of the audio representation; and
wherein the transmission module operable to provide the recording of the name comprises a transmission module operable to provide the first version or the second version of the audio representation based on presence based call routing rules, caller identification information, or phone number association.

10. The system of claim 9, wherein the audio representation of an accurate pronunciation of the name comprises an audio representation made by the particular user.

11. The system of claim 9, wherein the processor is further operable to receive a request from the endpoint to initiate a communication connection with the particular user.

12. The system of claim 11, wherein the transmission module is further operable to provide an audio representation of a name of a user affiliated with the endpoint to the particular user upon initiation of the communication connection.

13. The system of claim 9, wherein the list of the plurality of user names is associated with an instant messaging service.

14. The system of claim 9, wherein the processor is further operable to associate the particular user with a plurality of possible endpoints.

15. The system of claim 14, wherein the processor is further operable to provide presence information regarding which endpoint of the plurality of possible endpoints the particular user last used.

16. Software encoded on one or more non-transitory computer-readable media and when executed operable to:
create a recording of a name of a particular user in a network, the recording of the name comprising an audio representation of an accurate pronunciation of the name;
store the recording of the name in a storage location within the network;
provide a list of a plurality of user names and respective presence information regarding each of the plurality of users;
receive a request from an endpoint for the recording of the name of the particular user, the request for the recording being generated by the endpoint selecting the name of the particular user from the list of the plurality of user names;
access the storage location in response to the request; and
provide the recording of the name of the particular user in response to the request from the endpoint;
wherein the software when executed is further operable to:
create the recording of the name by creating a first version and a second version of the audio representation; and
provide the recording of the name by providing the first version or the second version of the audio representation based on presence based call routing rules, caller identification information, or phone number association.

* * * * *